May 11, 1971 M. H. PILKUHN ET AL 3,578,513

METHOD OF FABRICATING SOLUTION GROWN EXPITAXIAL PN-JUNCTIONS IN GALLIUM PHOSPHIDE

Filed Sept. 22, 1967 2 Sheets-Sheet 1

INVENTORS
MANFRED H. PILKUHN
MAX R. LORENZ
BY
JOSEPH H. GOLANT
ATTORNEY

United States Patent Office 3,578,513
Patented May 11, 1971

3,578,513

METHOD OF FABRICATING SOLUTION GROWN EPITAXIAL PN-JUNCTIONS IN GALLIUM PHOSPHIDE

Manfred H. Pilkuhn, Braunschweig, Germany, and Max R. Lorenz, Mahopack, N.Y., assignors to the United States of America as represented by the Secretary of the Navy Filed Sept. 22, 1967, Ser. No. 669,978
Int. Cl. H01l 7/46, 7/00
U.S. Cl. 148—171 7 Claims

ABSTRACT OF THE DISCLOSURE

The invention is a method of fabricating epitaxial grown p-n junctions from solution and comprises the steps of preparing a gallium phosphide crystal substrate, placing the crystal substrate in one end of a graphite boat, placing a gallium-saturated gallium phosphide solution in the other end of the graphite boat, adding a dopant to the solution, placing the graphite boat in a receptacle, passing a forming gas through the receptacle, heating the receptacle and the graphite boat to about 1140° C. in about 45 minutes, tipping the graphite boat so that the solution covers the substrate, cooling the receptacle and boat to about 700° C. in about 40 minutes and then to near room temperature from about 700° C. by shutting off the heating apparatus, separating the epitaxially overgrown substrate crystal from the mixture, cleaving the crystal at right angles to the overgrowth, etching the cleavage plane, lapping the substrate side of the crystal and alloying ohmic contacts simultaneously on the substrate side and the overgrowth of the crystal.

The invention described herein may be manufactured and used by or for the Government of the United States of America for governmental purposes without the payment of any royalties thereon or therefor.

BACKGROUND OF THE INVENTION

Field of invention

This invention relates to a method of epitaxial growth of a semi-conductor material on a crystal and more specifically to the method of epitaxial growth from a solution of gallium-gallium phosphide for fabricating electroluminescent p-n junctions.

Description of the prior art

Electroluminescent diodes are known in the art, Scientific America, May 1967, and may find extensive use in the laser field or in the computer art. The prior art, in addition, illustrates the use of gallium phosphide for the fabrication of the electroluminescent p-n junction diode by epitaxial growth; however, the growth has always been from a vapor state, as opposed to the epitaxial growth from a solution state as illustrated in the present invention. Epitaxial growth from the vapor state is illustrated by a patent to J. P. Short, 3,189,494. While the vapor state technique has been used, certain difficulties are encountered; among these were a lack of junction uniformity among the diodes constructed, lack of good reproducibility, relatively low diode efficiencies and poor diode characteristics.

SUMMARY OF THE INVENTION

Our invention provides a method of fabrication which leaves the finished diodes free from growth defects, and results in better uniformity, more accurate reproducibility and increased external quantum efficiencies.

Our method of fabrication comprises the steps of preparing a gallium phosphide crystal substrate, placing the crystal in one end of a graphite boat, placing a gallium saturated gallium phosphide solution in the other end of the graphite boat, adding a dopant to the solution, placing the graphite boat in a receptacle, passing a forming gas through the receptacle, heating the receptacle and the graphite boat to about 1140° C. in approximately 45 minutes, tipping the graphite boat so that the solution covers the substrate, cooling the mixture covered substrate from about 1140° C. to about 700° C. in approximately 40 minutes, cooling the mixture covered substrate from about 700° C. to near room temperature by shutting off the furnace which supplies the heat, separating the epitaxially overgrown substrate crystal from the excess mixture, cleaving the overgrown crystal at right angles to the overgrowth, etching the cleavage plane, lapping the substrate side of the crystal and finally alloying ohmic contacts simultaneously on the substrate side and the overgrowth side of the crystal.

The reproducibility and junction uniformity obtained with our new method of epitaxial growth not only produced a better diode but also permitted us to make a detailed study of the electrical and optical properties of red-light-emitting p-n junctions in gallium phosphide.

An object of our invention is to provide a method of fabricating solution grown epitaxial p-n junctions in gallium phosphide wherein the junctions are substantially uniform and readily reproducible.

Another object of our invention is to provide a method of fabricating electroluminescent diodes which have good efficiency and superior characteristics.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
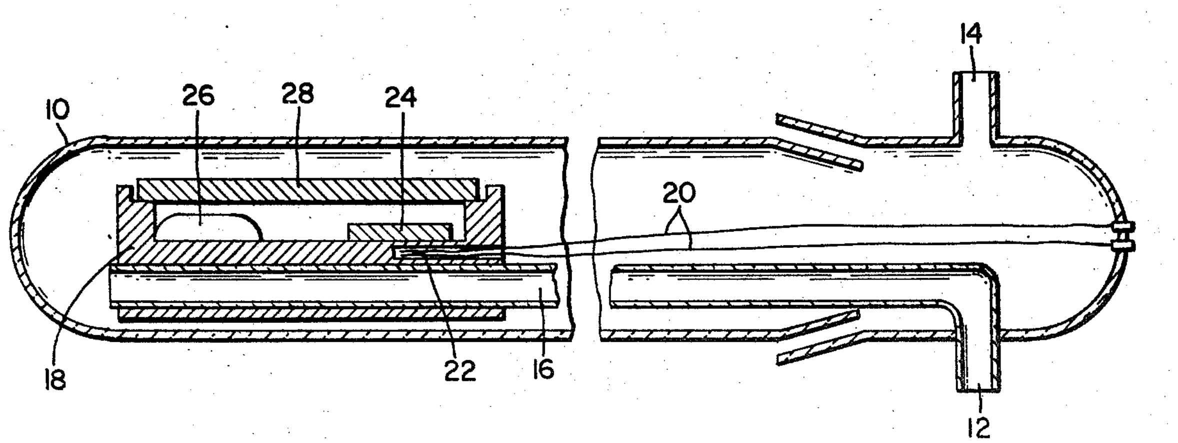
FIG. 1 is a diagrammatic section view of the apparatus in which the epitaxial growth occurred.

Referring now to the drawings wherein like reference numerals designate like or similar parts throughout the several views, there is shown in FIG. 1 a diagrammatic section view of the apparatus used for out inventive method. The apparatus comprises a quartz tube 10 having a gas inlet 12 and gas outlet 14 through which a forming gas is able to enter the quartz tube 10 by way of a conduit 16 directly connected to the gas inlet 12 thereby allowing the gas to circulate throughout the tube before being expelled through the gas outlet 14.

At one end of the quartz tube 10 is a graphite boat 18 shown mounted to the conduit 16; the graphite boat 18 is adapted to receive the material from which epitaxial growth will take place. A thermocouple 20 is placed within a well 22 formed in the base of the graphite boat 18.

Placed at one end of the graphite boat is a substrate 24 forming the base upon which epitaxial growth will take place. At the other end of the graphite boat is a gallium phosphide saturated gallium solution 26, the material from which epitaxial growth will occur.

SUBSTRATE PREPARATION

Before proceeding with the epitaxial growth of the p-n junction the method of substrate preparation will be disclosed first. The objective in the substrate preparation will be to grow a gallium phosphide single crystal by slow cooling of a gallium phosphide saturated gallium solution. Therefore, the first step will be to saturate a gallium solution with gallium phosphide. The composition of the solution chosen corresponded to liquidus temperatures between 1100° and 1180° C. The solution is doped with zinc and gallium oxide having atom concentrations of $7\times10^{-2}$ and $4.5\times10^{-2}$ percent, respectively. The solution may then be heated into the temperature range between 1100° C. and 1180° C. The solution is then cooled to about room temperature whereupon it usually forms a mass of dendritic crystals. Usually a few of the crystals will form platelets in sizes of about 1 square centimeter in dimensions with a thickness of up to one millimeter. Each of the crystals is then lapped on one of its sides and mechanically polished on the side opposite the lapped side so as to retain a (111) plane surface on the crystal. Prior to actually using the crystals they are lightly cleaned by dipping them into a boiling solution of 1HCl:$1H_2O$ solution for about 30 seconds.

The crystal formed is now suitable to act as a substrate upon which epitaxial growth from solution may be accomplished to form p-n junctions. The crystal will now be referred to as a substrate, designated 24, and is positioned as mentioned earlier in the graphite boat 18.

EPITAXIAL GROWTH

The method of epitaxial growth will be carried out in the apparatus described in FIG. 1. As mentioned, the crystal substrate 24 is placed at one end of the graphite boat 18 and may be held in place by a quartz pin (not shown) while at the other end of the graphite boat is the gallium phosphide saturated gallium solution 26. An appropriate dopant is then added depending upon whether the overgrowth is to be an n-type or a p-type. For the n-type overgrowth the dopant is tellurium while for the p-type overgrowth the dopant is zinc, the tellurium being a "donor" while the zinc is an "acceptor." The graphite boat may then be covered with a quartz lid 28. An atmosphere of forming gas is then provided in the quartz tube 10 while the graphite boat is heated to about 1140° C. This heating may be accomplished in approximately 45 minutes.

The graphite boat is tipped so that the solution 26 covers the crystal substrate 24. The solution covered substrate may then be cooled to about 700° C. in about 40 minutes. Then the furnace is shut off completely while the solution covered substrate cools to near room temperature. To isolate the now epitaxially overgrown substrate crystal from the remaining gallium phosphide saturated gallium solution the overgrown crystal is boiled in a solution of 1HCl:$1H_2O$. The epitaxial layer formed is approximately 60 to 80 microns in thickness. The overgrown crystal is cleaved at right angles to the overgrowth, that is, cleaved in the (110) plane which is at right angles to the (111) plane. The junction may be distinctly delineated by etching the cleavage plane with 1HF:$1H_2O_2$ solution while providing a strong illumination from a tungsten filament.

A diode is now formed by lapping the substrate side of the crystal to a thickness of about 8 mil so that the crystal can be easily cleaved into small triangular platelets less than 1 millimeter on an edge. Ohmic contacts may be alloyed simultaneously to the substrate side and the overgrowth side, the tab of gold–1% zinc alloy placed on the p side and a tab of gold–38% tin placed on the n side.

Figure 2:
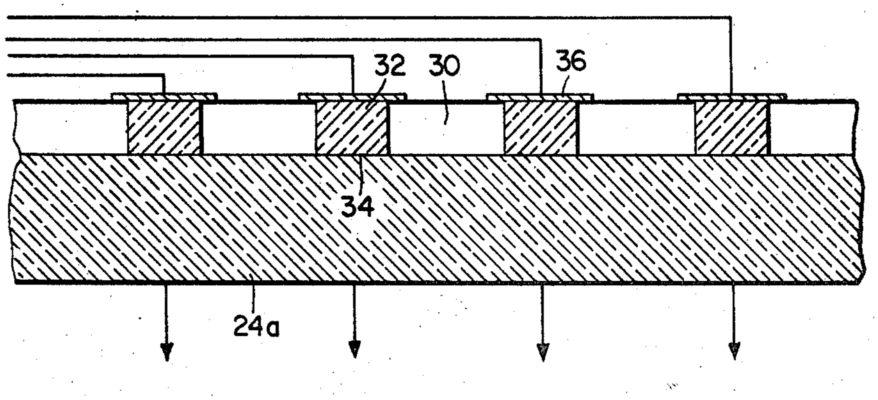
FIG. 2 is a diagrammatic cross section view of an electroluminescent display wafer illustrating the p-n junction.

From the above method the substrate may produce a large number of electroluminescent diodes. They may be fabricated either as individual diodes or in large number integrated on one wafer. When fabricating diode displays integrated in one wafer the gallium phosphide substrate is masked with a silicon oxide layer (designed to give the desired junction pattern on the substrate) before the epitaxial growth. Epitaxial growth occurs only at the places where the surface of the substrate has not been masked with silicon oxide. After the epitaxial growth the surface is polished and provided with the desired ohmic contacts. This method is particularly important for the fabrication of integrated electroluminescent displays. FIG. 2 illustrates such an integrated diode with substrate **24*a* providing the support upon which strips of silicon oxide 30 are formed before initiating the method for epitaxial growth. Once the method is completed overgrowth layer 32 is formed which, if the substrate is a p-type and the overgrowth is an n-type, will form a p-n junction designated at 34 giving the diode its electrical characteristics. Ohmic contacts such as at 36** are then alloyed to the diode to allow circuit connection. (The arrows indicate the direction of light given off by the display.)

The quality of formation of an epitaxial overgrowth layer could be judged by inspection of the surface, a microscopic investigation of the surface usually reveals a smooth, mirror-like surface if the substrate was essentially perfectly aligned in the (111) plane. A slightly terraced surface is observed if the substrate crystal has a slight misalignment of a degree or so. For a temperature of 1140° C. the thickness of the growth averaged about 60 microns. The junctions with few exceptions were very planar and the epitaxial layer showed good perfection under microscopic observation despite the rather rapid growth.

Figure 3:
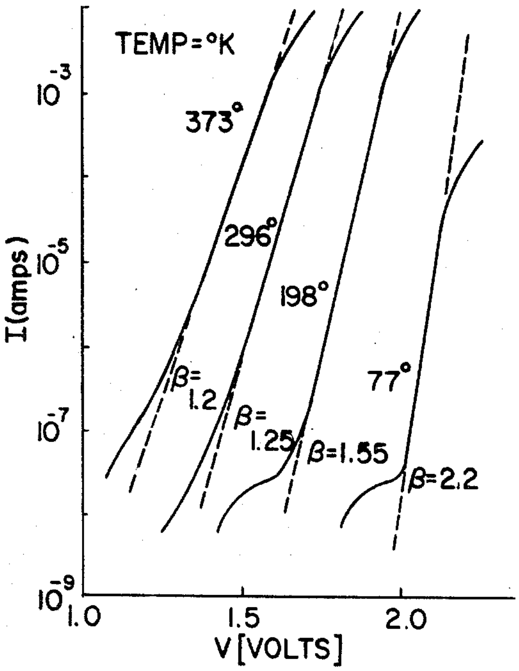
FIG. 3 is a current-voltage graph of a diode made by our method illustrating the diode characteristics obtained at various temperatures.

The electrical properties of the p-n junctions, which were free from gross defects, that is, no inclusions, in the overgrowth were studied. FIG. 3 illustrates the current-voltage characteristics of a diode containing zinc and oxygen on the p side and tellurium on the n side. For all temperatures (77° to 373° K.), the current varies exponentially with the voltage over a current range of several orders of magnitude according to the equation $I=I_0 \exp(eV/\beta kT)$ where I indicates current, $I_0$ indicates current at zero voltage, $e$ indicates the electron charge, V indicates the voltage, $\beta$ indicates a constant, $k$ indicates the Boltzman constant, and T indicates temperature in degrees Kelvin. It was found that the slope of the lines indicated a $\beta$ within the range of 1.5 to 1.8 at the higher temperatures (to 300° K.) and 1.8 to 2.2 at 77° K. in the majority of cases.

Figure 4:
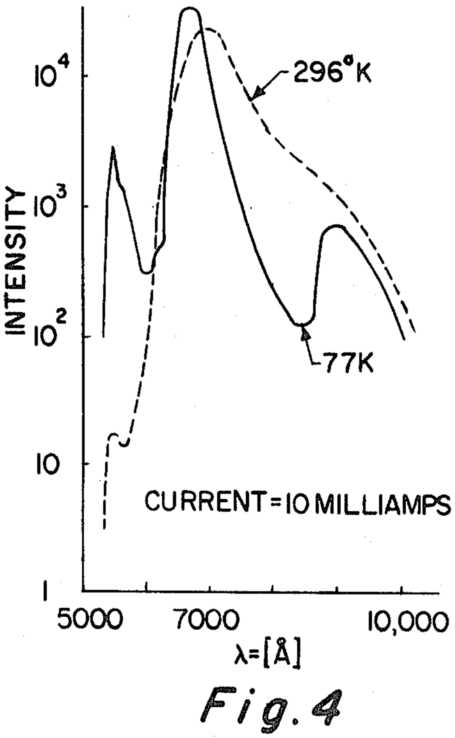
FIG. 4 is an emission spectra graph of a diode made by our method, the diode containing tellurium on the n side and zinc and oxygen and the p side.
Figure 5:
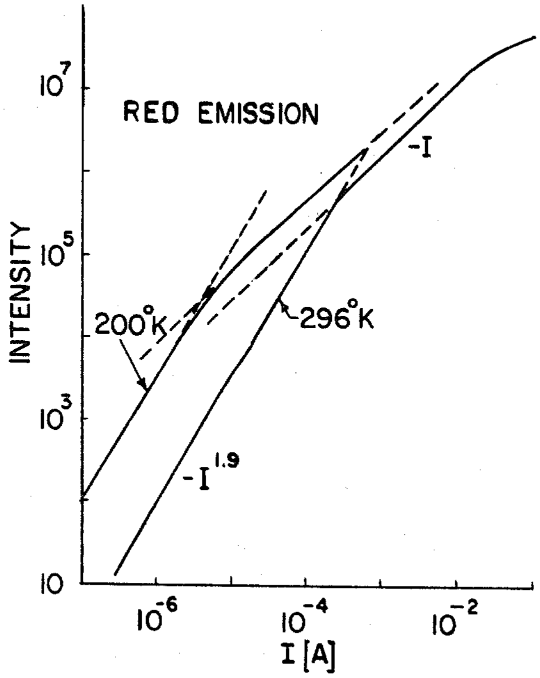
FIG. 5 is a graph from a diode fabricated by our method illustrating the dependency of the intensity of the red emission band upon current.
Figure 6:
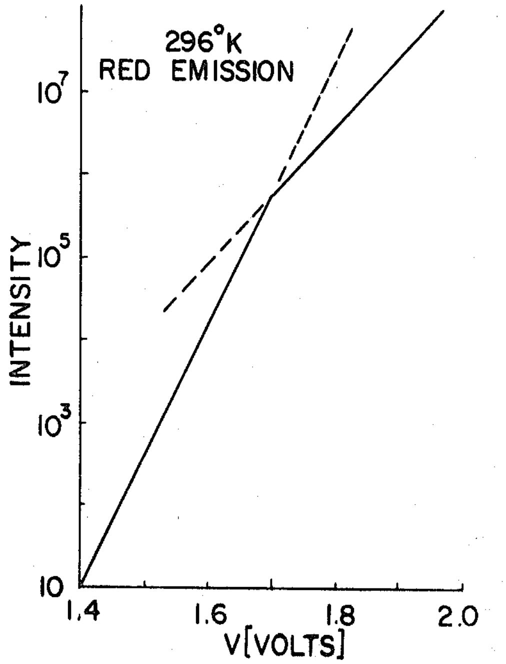
FIG. 6 is a graph from a diode fabricated by our method illustrating the dependency of intensity of the red emission band upon voltage.

FIGS. 4, 5 and 6 illustrate the optical properties of diodes made by the inventive method. As shown in FIG. 4, an emission spectra of a diode containing tellurium on the n side and zinc and oxygen on the p side was plotted at 77° K. and 296° K. The peak of the dominant emission band was near 7000 angstroms when at room temperature (296° K.), 7000 angstroms indicating the color red.

In FIG. 5 the red emission intensity has been plotted against diode current for two temperatures, 200° K. and 296° K. As is shown, the intensity increases approximately with the square of the current at low currents and changes at high currents wherein the intensity increased linearly with the current.

FIG. 6 indicates an intensity dependency of the red emission band on voltage at 296° K., which also shows a variation in slope depending upon whether the voltage is low or high.

As mentioned earlier, one of the drawbacks of the prior art is that the external differential quantum efficiency is quite low. The diodes produced by our method have had quantum efficiencies measuring as high as $7.5\times10^{-3}$ or 0.75 percent at room temperature, and diodes with room temperature efficiencies of 0.3% to 0.5% have been fabricated with good reproducibility in large quantities.

Obviously many modifications and variations of the present invention are possible in the light of the above teachings. It is therefore to be understood that within the scope of the appended claims the invention may be practiced otherwise than as specifically described.

We claim:

1. In a method of fabricating upon a n-type gallium phosphide crystal substrate from a doped solution of gallium-gallium phosphide uniform and reproducible p-n junctions by epitaxial solution growth comprising the steps of:

heating the crystal substrate and the solution to about 1140° C. in approximately 45 minutes;

covering the substrate with the solution;

cooling said solution covered substrate to about 700° C. in approximately 40 minutes; and cooling said solution covered substrate from about 700° C. to room temperature.

2. A method of fabricating solution grown epitaxial p-n junctions in gallium phosphide comprising the steps of:

preparing a n-type gallium phosphide crystal substrate;

placing said crystal substrate in one end of a graphite boat;

placing a gallium-gallium phosphide solution in the other end of the graphite boat;

adding a dopant to the solution;

placing said graphite boat in a receptacle;

passing a forming gas through the receptacle;

heating the receptacle and the graphite boat to about 1140° C;

tipping the graphite boat so that the solution covers the substrate;

cooling said solution covered substrate to about 700° C. in approximately 40 minutes for forming the epitaxial growth;

cooling said receptacle and said boat from about 700° C. to near room temperature;

separating the epitaxially overgrown substrate crystal from the mixture;

cleaving said crystal at right angles to the overgrowth;

etching said cleavage plane;

lapping the substrate side of the crystal; and alloying ohmic contacts simultaneously on the substrate side and the overgrowth side.

3. A method of fabricating as claimed in claim 2 wherein:

heating of the receptacle and the graphite boat to about 1140° C. is accomplished in approximately 45 minutes;

cooling of the mixture covered substrate from about 1140° C. to about 700° C. is accomplished in about 40 minutes; and cooling of the mixture covered substrate from about 700° C. to near room temperature is accomplished by shutting off the heat.

4. A method of fabricating as claimed in claim 3 wherein:

the receptacle is a quartz tube;

the separation of the epitaxially overgrown substrate crystal from the mixture is accomplished by boiling the substrate crystal in a solution of $1HCl:1H_2O$;

the crystal is cleaved in the 110 plane which is at right angles to the overgrowth, 111 plane;

the etching is accomplished with a $1HF:1H_2O_2$ solution; and the ohmic contacts are a tab of gold–1% zinc alloy on the substrate p side and a tab of gold–38% tin alloy on the growth n side.

5. A method of fabricating as claimed in claim 4 wherein:

the dopant is tellurium for an n-type overgrowth.

6. A method of fabricating as claimed in claim 4 wherein:

the dopant is zinc for a p-type overgrowth.

7. A method of fabricating as claimed in claim 3 wherein the steps of preparing a n-type gallium phosphide crystal substrate comprise:

saturating a gallium solution with gallium phosphide;

heating the saturated solution to between 1100° C. and 1180° C.;

doping the saturated solution with zinc and gallium oxide at atom concentrations of $7\times10^{-2}$ and $4.5\times10^{-2}$ percent respectively;

cooling said solution to about room temperature;

lapping the crystals on one of its sides and polishing on the other of its sides so as to retain a 111 plane surface on the crystal; and cleaning said crystal by dipping it for about 30 seconds into a boiling $1HCl:H_2O$ solution.

References Cited

UNITED STATES PATENTS

| | | | |
|---|---|---|---|
| 3,158,512 | 11/1964 | Nelson et al. | 148—1.5 |
| 3,462,320 | 8/1969 | Lynch et al. | 148—171 |
| 3,463,680 | 8/1969 | Melngailis et al. | 148—172 |

OTHER REFERENCES

Nelson: RCA Rev. 24, pp. 603–615, 1963.

Lorenz and Pilkuhn: J. Appl. Phys. 37, #11, pp. 4094–4095, October 1966.

L. DEWAYNE RUTLEDGE, Primary Examiner

W. G. SABA, Assistant Examiner

U.S. Cl. X.R.

23—204, 301; 117—106, 201; 148—1.6, 172, 173; 252—62.3